United States Patent Office.

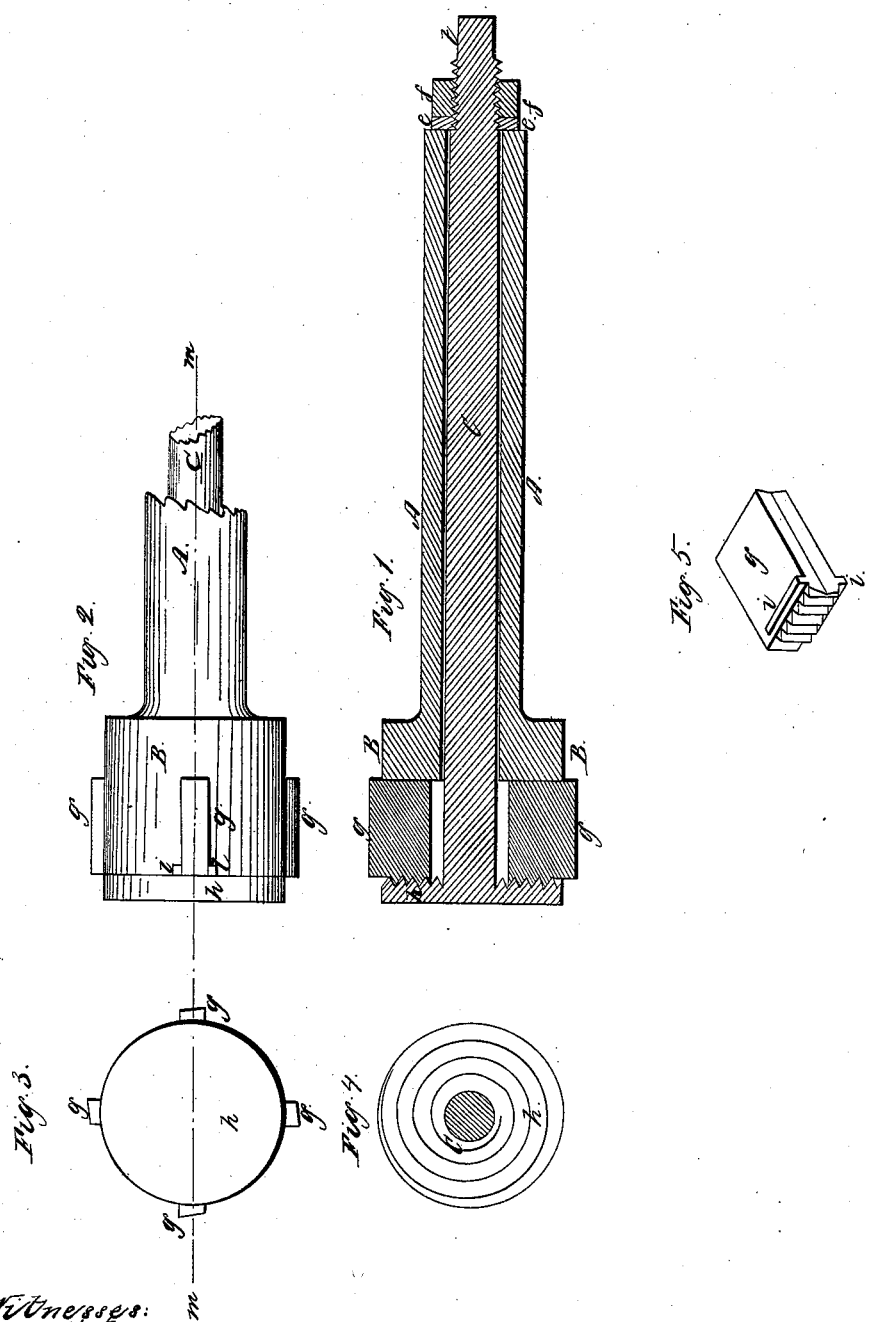

EDWARD SULLIVAN, OF PITTSBURG, PENNSYLVANIA.

Letters Patent No. 85,545, dated January 5, 1869; antedated December 17, 1868.

IMPROVED REAMING-TOOL.

The Schedule referred to in these Letters Patent and making part of the same.

*To all whom it may concern:*

Be it known that I, EDWARD SULLIVAN, of Pittsburg, in the county of Allegheny, and State of Pennsylvania, have invented a new and useful Improvement in "Graduating-Reamer;" and I do hereby declare the following to be a full and exact description thereof, reference being had to the accompanying drawings, and to the letters of reference marked thereon.

My invention consists in the construction and arrangement of cutter-head, cutters, adjusting-rod, clamping-nuts, washer, and scroll-screw-thread, the whole making a reamer, the cutters of which can be graduated so as to bore holes of different diameters, the whole being constructed, combined, arranged, and operating in the manner hereinafter described.

To enable others skilled in the art to make and use my invention, I will proceed to describe its construction and operation.

In the accompanying drawings, making part of this specification—

Figure 1 is a longitudinal section of my improved reamer, cut through at the line $m$, figs. 2 and 3.

Figure 2 is a side elevation of the same.

Figure 3 is an end view.

Figure 4 is a face view of the scroll-disk.

Figure 5 is a perspective view of the cutters of my improved reamer.

In fig. 1, A represents the shank of the reamer, with the enlarged end B, to receive the cutters $g$.

C is a rod or stem which runs through the shank A.

$h$ is a disk with a scroll-screw-thread cut upon its face, and is fastened upon the end of the rod C, (see fig. 1.) Upon the other end of the rod are the washer $e$ and nut $f$, which complete the parts.

The manner in which I construct my reamer is as follows:

I make the shank A with a hole through it to receive the rod C, with slots in the end to receive the cutters $g$, of any suitable material, which may be cast-iron, wrought-iron, or steel, and into it I insert the iron or steel rod or stem C, having on one end a disk, $h$, upon the face of which is cut the scroll-screw-thread, as shown in figs. 1 and 4, for the purpose of operating the cutters. Upon the other end I form the square, $t$, to receive a wrench, for the purpose of turning the rod to set the cutters, and the screw-thread to receive the nut $f$, which is used to fasten the rod C and hold the cutters to their place when set to the required size.

The cutters I make of steel, and in the form shown in fig. 5. Upon one end of the cutters are formed scroll-screw-threads, to work into the disk $h$, and on the sides, near the same end, are formed the ribs $i$, which fit into corresponding recesses in the end of the head B, for the purpose of guiding the cutter, as it is moved back and forth in the head, and also to steady and strengthen it while in operation.

Having all parts made and placed in position, as shown in figs. 1 and 2, the reamer is then ready for use, which is as follows:

By unscrewing the nut $f$, and placing a wrench upon the square, $t$, and turning the rod C in the required direction, the cutters $g$ will be moved to or from the centre of the reamer, as the case may be, through the medium of the scroll-screw-threads on the disk $h$ and cutters $g$. The nut $f$ is then tightened, which brings the disk $h$ up against the cutters $g$, and the cutters up against the enlarged part of the shank or head B, and binds them firmly to their place. The reamer is now applied to the work, in the same manner as the ordinary reamer, or "rose-bit," and is well known to the skilful mechanic, and therefore not necessary to be described.

I wish it understood I do not confine myself to any size, proportion, or kind of material used in construction of my reamer, as the same may be varied to suit the judgment and taste of the mechanic making and using it.

Having thus described the nature, construction, and operation of my improvement,

What I claim as of my invention, is—

The arrangement of the shank A, cutter-head B, adjusting-rod C, scroll-disk $h$, clamping-nut $f$, and cutters $g$, the whole being constructed, arranged, and operating as herein described, and for the purpose set forth.

EDWARD SULLIVAN.

Witnesses:
JAMES J. JOHNSTON,
JAMES McBRID.